May 13, 1969     P. A. HAWLEY ET AL     3,443,479
DEPTH ADJUSTMENT FOR POWER TOOL
Filed Aug. 29, 1966     Sheet 2 of 2
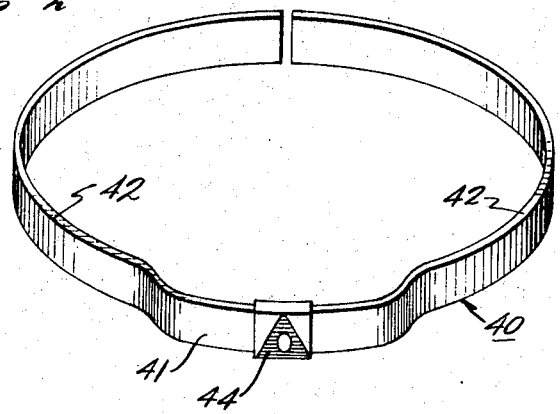
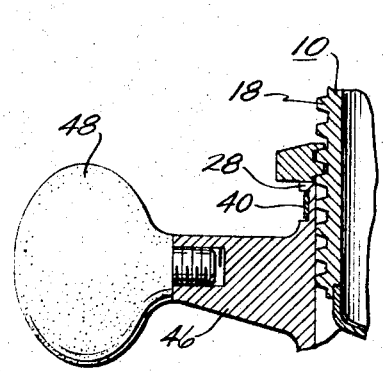
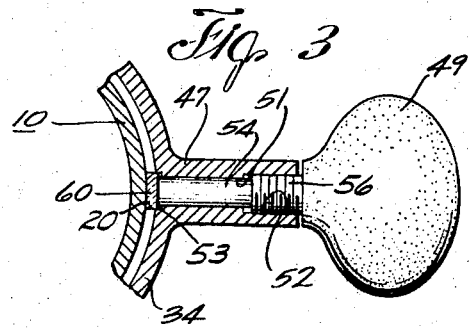
Inventors.
PAUL A. HAWLEY
JERRY G. EIKERMANN
BY Robert W. Raletonen
Attorney.

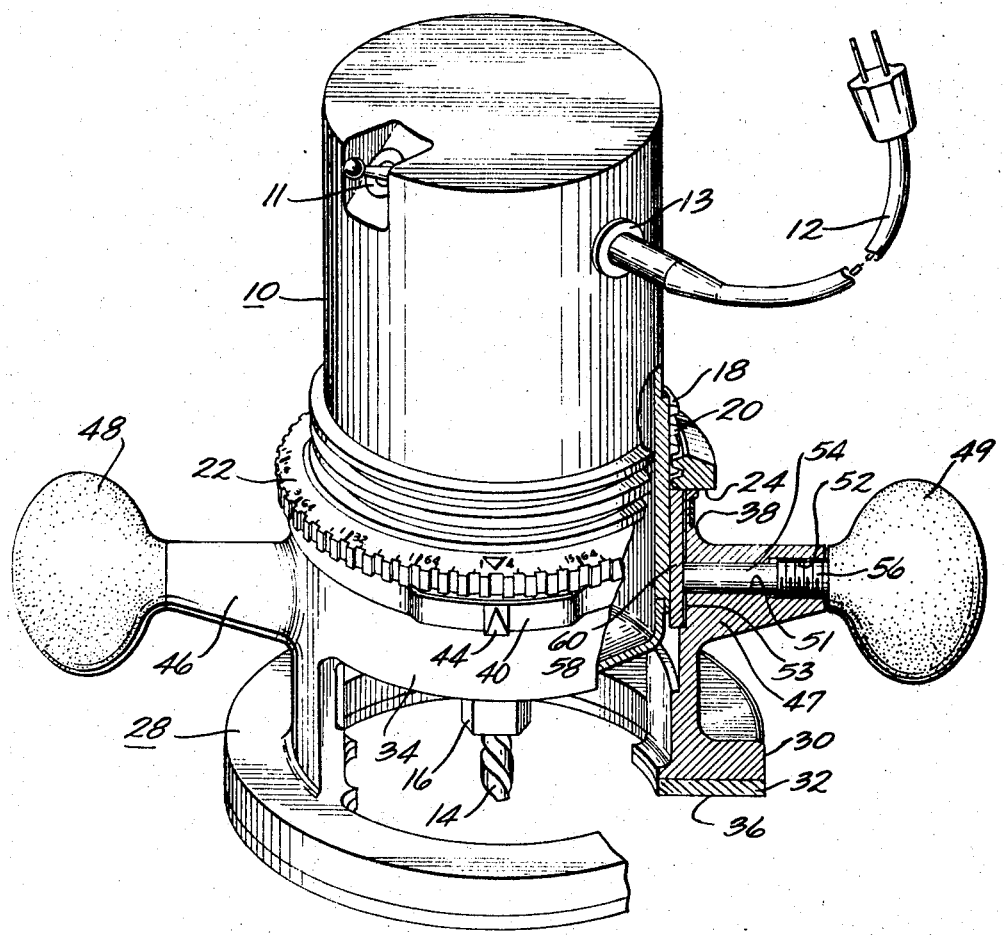

United States Patent Office 3,443,479
Patented May 13, 1969

3,443,479
DEPTH ADJUSTMENT FOR POWER TOOL
Paul A. Hawley and Jerry G. Eikermann, Jefferson City, Mo., assignors to McGraw-Edison Company, Milwaukee, Wis., a corporation of Delaware
Filed Aug. 29, 1966, Ser. No. 575,619
Int. Cl. B23c 1/20; B27c 5/10
U.S. Cl. 90—12                                6 Claims

ABSTRACT OF THE DISCLOSURE

A portable router including a motor having a threaded casing slidably received within a cylindrical base, an adjusting nut threadably engaging the casing and abutting the base and thereby positioning the motor relative to the base. The motor casing and base having cooperating keyways and a key received therein frictionally engaging the motor casing for preventing relative rotation and relative axial movement between the motor and the base. Means are provided for calibrating the depth of cut desired.

---

This invention relates to routers and, more particularly, to an improved structure for adjusting the depth of cut of the router cutting tool.

With the proliferation of power tools with respect both to the individuals that own and use such equipment and the variety of types of such tools, it is important that the operation of this equipment be simplified both for accurate operation and to assure that the purchaser will be more likely to realize the full utility of the equipment.

In the present invention, the tool depth adjustment for a router is provided whereby the tool can vertically advance toward the work or withdraw by a direct reading adjustment following ascertainment of a zero reference setting which is easily established. Further, in the embodiment illustrated the motor casing is locked to the base following setting of the tool depth by rotation of one of the manipulating handles.

It is an object of this invention to provide an improved depth adjustment for a router.

It is a further object of this invention to provide a router adjustment which can be effected by a direct reading calibration carried on the adjusting member.

It is also an object of this invention to provide a router depth adjusting structure which is simple in operation and utilizes a minimum of separate adjusting apparatus.

These and other objects and advantages of this invention will become apparent from the following description when taken in connection with the accompanying drawings, wherein:

FIGURE 1 is a perspective view of a router incorporating the depth adjustment of this invention, with portions thereof broken away and in section;

FIGURE 2 is a perspective view of the pointer ring;

FIGURE 3 is a partial horizontal section view of the manipulating handle at the right side of FIGURE 1; and FIGURE 4 is a partial vertical section of the base and motor casing showing the manipulating handle at the left side of FIGURE 1.

Referring to the drawings, FIGURE 1 shows a router which includes a cylindrical motor casing 10 having an on-off switch 11 mounted thereon and a line cord 12 extending away therefrom through a grommet 13. At the lower end of the motor casing is a cutting tool 14 which is secured to the driven shaft projecting from the lower end of the motor casing by a chuck 16. Surrounding the lower portion of the motor casing and projecting from the surface as a unitary part of the casing is a thread 18 that helically advances about the casing to form an exterior threaded surface except for the interruption of a vertical groove 20. The threaded surface is engaged by an adjusting nut 22 which presents interior cooperating thread portions and a lower horizontal surface 24.

The base member 28 has a lower platform portion 30 which terminates at the lower end in a base plate 32 which engages the work and an upper housing portion 34 which surrounds the lower periphery of the motor casing. As the lower surface 36 of the base plate engages the work, the base plate 32 is formed of a rigid fiber or other nonmarring material. The housing portion 34 has a vertical bore which slidably receives the motor casing assembly about the cylindrical surface defined by the flats of the threads 18 surrounding the motor casing. The adjusting nut presents a lower surface 24 that abuts the upper radial surface of the base member 28 to determine the axial telescoping relation between motor casing 10 and base member 28 and, consequently, the relative position of the lower terminus of the cutting tool 14 with respect to the work-engaging surface 36 of the base plate 32. There is formed in the exterior peripheral surface of the base member just below the upper surface abutted by the adjusting nut a horizontal peripheral groove 38 in which is disposed a pointer ring 40. The pointer ring 40, as seen in FIGURE 2, is a split loop of resilient strip material that has an intermediate portion 41 of increased radius with adjoining cylindrical surface segments 42 which frictionally engage the axial surface of the base housing peripheral groove 38. The pointer element 44 carried by the ring 40 may accordingly be manually rotated to any position about the periphery of the housing portion 34 of base member 28 to thereby achieve any desired alignment with the adjusting nut 22 to indicate a zero adjustment.

Projecting from either side of the base member are cantilevered arms or bosses 46, 47 at the outward end of each of which are respectively carried manipulating handles 48, 49 to provide for holding the router manually and controlling the device during operation. The handle 48, as seen in FIGURE 4, is merely secured at the end of the cantilevered arm or boss 46. The cantilevered arm or boss 47 has a passageway 51 extending therethrough with an internally threaded enlarged outward end portion 52. A threaded stud 56 is fixedly secured to the handle 49 and received by the passageway internally threaded end portion 52. A vertically extending groove 53 provided in the interior bore of base member 28 is aligned with groove 20 in motor casing 10. A key member 60 is disposed in the space defined by the aligned vertical grooves 20 and 53 to prevent relative rotation between base member 28 and motor casing 10. A pressure rod 54 is slidably received and held captive in the unthreaded portion of passageway 51 between key 60 and stud 53. Axial movement of casing 10 with respect to base 28 may be restrained by turning handle 49 to advance stud 56 further into passageway 51 to exert a compressive force through compression rod 54 and key 60 against casing 10.

The depth of cut adjustment of the tool 14 is effected by initially establishing a zero position with the tool end flush with the work-engaging surface 36 of the router base 28. This may be accomplished in the normal position by turning the handle to release the compressive engagement between pressure rod 54 and key member 60 permitting vertical sliding motion between motor casing 10 and base 28 as the adjusting nut 22 is rotated. The adjusting nut 22 is rotated until the lower surface of the tool is brought into coplanar relationship with the work-engaging surface of the base member. The same result can be achieved by inverting the router and moving the adjusting nut 22 to achieve the proper adjustment using a straight edge resting on the work-engaging surface 36 and extending over the tool 14. When the zero adjustment is established the pointer ring 40 is manually rotated until it is in alignment with the zero position on adjustment nut 22 as shown in FIGURE 1. The router tool depth can then be adjusted by rotating adjusting nut 22 to bring the proper depth of cut indicia into alignment with the setting established on the pointer ring. In the embodiment illustrated a thread pitch of one-quarter inch (¼″) has been utilized so that each revolution of the adjusting nut advances the tool one-quarter inch (¼″), and it will be seen that each marked graduation adjacent the periphery of the adjusting nut indicates one-sixty-fourth inch (1/64″) advance with finer graduations marked intermediate each one-sixty-fourth (1/64) adjustment. When the depth has been set it is only necessary to rotate the handle 49 to effect compressive engagement between the pressure rod 54 and the key member 60 to drive the key into compressive engagement with the casing member 10 and thereby lock the casing with respect to the base 28. It will also be observed that the key member 60 is held captive at its upper and lower ends by the lower surface of adjusting nut 22 and the base member shoulder 58 respectively.

Although but one embodiment has been shown and described, it will be apparent to those skilled in the art that various changes and modifications may be made therein without departing from the spirit of the invention or from the scope of the appended claims.

We claim:

1. A portable router, comprising a motor casing having a threaded lowered peripheral surface; a base member having a generally cylindrical opening slidably receiving said motor casing threaded surface; retaining means operable to prevent relative rotation of the motor casing within the base member opening, and including opposed keyways on the motor casing and the base member and a key member disposed within the keyways; said base member having a horizontal upper surface margining said opening, and an adjusting nut threadably engaging said motor casing threaded surface and having a lower surface abutting the base member upper surface operable upon rotation to move the motor casing axially of the base member; means for preventing axially movement between the motor casing and base member, and including means adjustable of the base member and engaging the key member and forcing the key member frictionally against the motor casing; and means for calibrating the depth of cut of the router and including pointer means axially confined on and resiliently frictionally engaging the base member and rotatable thereon to adjusted positions relative to the base member, and indicia on the adjusting nut that correlates rotation of the adjusting nut to axial movement of the motor casing.

2. A portable router according to claim 1, wherein said axial movement preventing means includes a threaded passageway open to the base member keyway, and the adjustable means includes a threaded element cooperatively engaging the threaded passageway and abutting the key member.

3. A portable router according to claim 2 further providing a pair of handles on the base member, and wherein the adjustable threaded element serves as one of the handles.

4. A portable router according to claim 1, wherein the calibrating means includes a groove open radially outwardly of the periphery of the base member adjacent said upper surface, and wherein the pointer means is disposed within the groove.

5. A portable router according to claim 4, wherein the pointer means includes a resilient band with a raised intermediate area having an indicia thereon which serves as the pointer.

6. A portable router according to claim 4, wherein said axial movement preventing means includes a threaded passageway open to the base member keyway, and the adjustable means includes a threaded element cooperatively engaging the threaded passageway and abutting the key member.

References Cited

UNITED STATES PATENTS

| 2,785,716 | 3/1957 | Lutton | 144—134.5 |
| 2,842,173 | 7/1958 | Turner et al. | 144—136.3 |
| 2,867,251 | 1/1959 | Moretti et al. | 144—136.3 |
| 2,988,119 | 6/1961 | Godfrey et al. | 144—136.3 |

ANDREW R. JUHASZ, *Primary Examiner.*

G. WEIDENFELD, *Assistant Examiner.*

U.S. Cl. X.R.

144—136